(12) United States Patent
Lunde

(10) Patent No.: US 8,126,325 B2
(45) Date of Patent: Feb. 28, 2012

(54) APPARATUS, AN OPTICAL UNIT AND DEVICES FOR USE IN DETECTION OF OBJECTS

(75) Inventor: Tom Lunde, Blommenholm (NO)

(73) Assignee: Tomra Systems ASA, Asker (NO)

( * ) Notice: Subject to any disclaimer, the term of this patent is extended or adjusted under 35 U.S.C. 154(b) by 0 days.

(21) Appl. No.: 12/739,265

(22) PCT Filed: Nov. 6, 2008

(86) PCT No.: PCT/NO2008/000390
§ 371 (c)(1),
(2), (4) Date: Jul. 26, 2010

(87) PCT Pub. No.: WO2009/061207
PCT Pub. Date: May 14, 2009

(65) Prior Publication Data
US 2010/0290767 A1    Nov. 18, 2010

(30) Foreign Application Priority Data
Nov. 7, 2007 (NO) .................................. 20075684

(51) Int. Cl.
*G03B 19/00* (2006.01)
(52) U.S. Cl. ......... 396/429; 396/431; 209/522; 348/127
(58) Field of Classification Search .............. 396/4, 429, 396/431; 348/127; 209/522
See application file for complete search history.

(56) References Cited

U.S. PATENT DOCUMENTS

| | | | |
|---|---|---|---|
| 5,233,186 A * | 8/1993 | Ringlien | 250/223 B |
| 5,898,169 A | 4/1999 | Nordbryhn | |
| 6,290,381 B1 | 9/2001 | Mangum et al. | |
| 7,754,990 B2 * | 7/2010 | Saether | 209/524 |
| 2003/0133083 A1 | 7/2003 | Chen et al. | |
| 2004/0135912 A1 * | 7/2004 | Hofflinger et al. | 348/308 |
| 2005/0190426 A1 | 9/2005 | Urakawa et al. | |
| 2006/0226215 A1 * | 10/2006 | Yu et al. | 235/379 |
| 2010/0321152 A1 * | 12/2010 | Argudyaev et al. | 340/5.53 |
| 2011/0069507 A1 * | 3/2011 | Haugan et al. | 362/551 |

FOREIGN PATENT DOCUMENTS

| | | |
|---|---|---|
| JP | 62125319 A | 6/1987 |
| JP | 2004088262 A | 3/2004 |
| WO | 2004003845 | 1/2004 |

* cited by examiner

*Primary Examiner* — Rodney Fuller
*Assistant Examiner* — Linda B Smith
(74) *Attorney, Agent, or Firm* — Rodman & Rodman

(57) ABSTRACT

An apparatus for generating and viewing an image of an item (95) against a reflective surface (94) with a light source (85), a camera (97) and operational electronics (98) installed on a single, common circuit board (99) located with a plane thereof along an exterior upright wall (102') of a closed optics compartment (102). The light source faces a window element (103) of the closed optics compartment with a first light guide part (86) and directs light further into the optics compartment by means of a second light guide part (86') located on the other side of the window element and aligned with the first light guide part (86). An optical unit is located in the optics compartment and comprises a light path extender (89, 90, 91), a light source input region, a lens unit (93), and at least one image detection output region. The light source input region comprises said first tubular light guide part (86) contacting the outside of the window (103), and the second tubular light guide part (86') contacting the inside face of the window element (103) and aligned with the first light guide part (86), said second light guide part (86') at a downstream end having a 45° inclined, first light redirecting mirror (87), and an output aperture with a light diffuser (88).

34 Claims, 4 Drawing Sheets

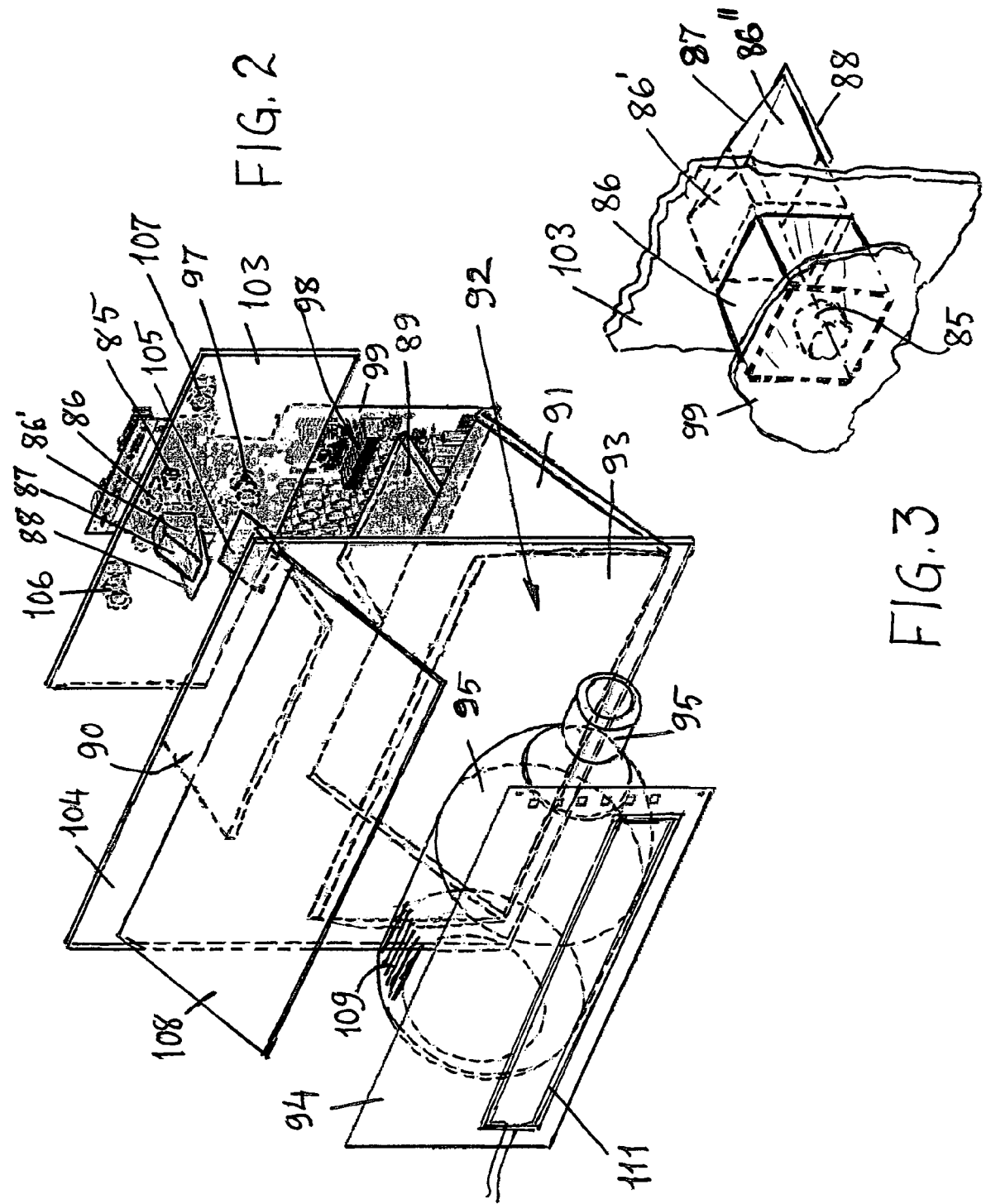

APPARATUS, AN OPTICAL UNIT AND DEVICES FOR USE IN DETECTION OF OBJECTS

The present invention relates to an apparatus for generating and viewing an image of an item at least partly against a specular or a retro-reflective surface, as defined in the preamble of claim 1; an optical unit, as defined in claim 14; a device for use in generating and viewing an image of an item at least partly against a specular or a retro-reflective surface via an optical unit, as defined in the preamble of claim 24; and a device for directing light from a light source towards an optical unit, as defined in claim 31.

In a recent RVM (return vending machine) structure, as disclosed in PCT/NO2006/000029, the items are after identification delivered in a non-destructured state into at least one vertical storage chamber to move in an upward direction therein. The RVM is compact and is suitable at locations where the RVM may have a height in the range of e.g. 200-250 cm. However, at other locations, the height dimension may be problematic, in addition to the available space in depth and length being crucial parameters. Further, in most cases such RVM's are designed to operate indoors or at least in a sheltered environment to protect sensitive electronics and above all optics from operational failure, e.g. due to moist, dust and changes in temperature. However, when an RVM is located for operation in a dusty or polluted atmosphere, such as e.g. at least partly outdoors, there is present another challenge related to generating and viewing an image of an item against a specular or retro-reflective surface, due to inherent problems caused by deposition of dust and polluting particles on parts which form an optical unit. Such deposition is often caused by heat generating components in the RVM and which cause a so-called chimney-effect.

The invention has therefore as an object to provide apparatus which in cooperation provide an RVM having outstanding properties with regard to compact physical structure, i.e. reduced cabinet size, operational stability, protected detection equipment, and simple material detection of items.

Although the invention is in particular useful in reverse vending machines (RVM), it will be readily understood by the average expert in the art that the apparatus as disclosed may be used separately in other RVM's or related equipment suited for collecting and handling returnable items.

The apparatus of the invention makes use of a light source, a camera and operational electronics installed on a single, common circuit board located with a plane thereof along an exterior upright wall of a closed optics compartment. The wall comprises a transparent window element, and a second and opposite wall of the compartment next to a space where an article is to be viewed, said second wall comprising a lens or a window with an associated lens. The light source faces a window element of the closed optics compartment with a first light guide part and directs light further into the optics compartment by means of a second light guide part located on the other side of the window element and aligned with the first light guide part.

The optical unit is located in a closed optics compartment and light path extender comprising a plurality mirrors, a light source input region, a lens unit, and at least one image detection output region. A window forms said input and output regions, and the light source input region comprises a light source, a first tubular light guide part contacting the outside of the window, and a second tubular light guide part contacting the inside face of the window and aligned with the first guide part, said second light guide part at a downstream end having a first light redirecting mirror, e.g. inclined at 45°, and an output aperture with a light diffuser.

The device for use in generating and viewing an image of an item at least partly against a reflective surface via an optical unit comprises a light source, a camera and operational electronics installed on a single, common circuit board positioned exterior to and with its plane along an upright face of a transparent window of a closed compartment which comprises the optical unit. Further, the device has illumination means comprising a light source, a first tubular light guide part contacting an outside of the window, and a second tubular light guide part contacting the inside face of the window and aligned with the first guide part, said second light guide part at a downstream end having a first light redirecting mirror, e.g. inclined at 45°, and an output aperture with a light diffuser to direct light to the optical unit.

The device for delivering light from a light source to a light output aperture of an optical unit inside an optics compartment, comprises a first tubular light guide part cooperative with the light source at an upstream end of the first light guide part to direct light from a downstream end of the first light guide part through a window of the compartment, then into a second tubular light guide part aligned with the first light guide part, and then towards an optical light path in the optical unit, the second light guide part at its downstream end having a light redirecting mirror, e.g. inclined at 45°, to direct the light to the output aperture, and wherein the output aperture is provided with a light diffuser.

The characteristic features of the apparatus for generating and viewing an image of an item at least partly against a specular or a retro-reflective surface, are defined in claim 1. Further embodiments of the apparatus are defined in the dependent claims 2-13.

The characteristic features of the optical unit are defined in claim 14. Further embodiments of the optical unit are defined in the dependent claims 15-23.

The characteristic features of the device for use in generating and viewing an image of an item at least partly against a specular or a retro-reflective surface via an optical unit are defined in claim 24. Further embodiments of the device are defined in the dependent claims 25-30.

The characteristic features of the device for directing light from a light source towards an optical unit are defined in claim 31. Further embodiments of the device of the device are defined in the dependent claims 32-34.

The invention is now to be further explained with reference to the attached drawings which exhibit typical embodiments of the invention, although these are not to be construed as in any way limiting the scope of the invention, but are included merely to appreciate the concepts of the invention.

FIGS. 1, 2 and 3 illustrate an apparatus, according to the invention, for detecting images and other features of a collectable item.

The invention aims at providing an apparatus for viewing an item at least partly against a reflective surface.

Figure 4:
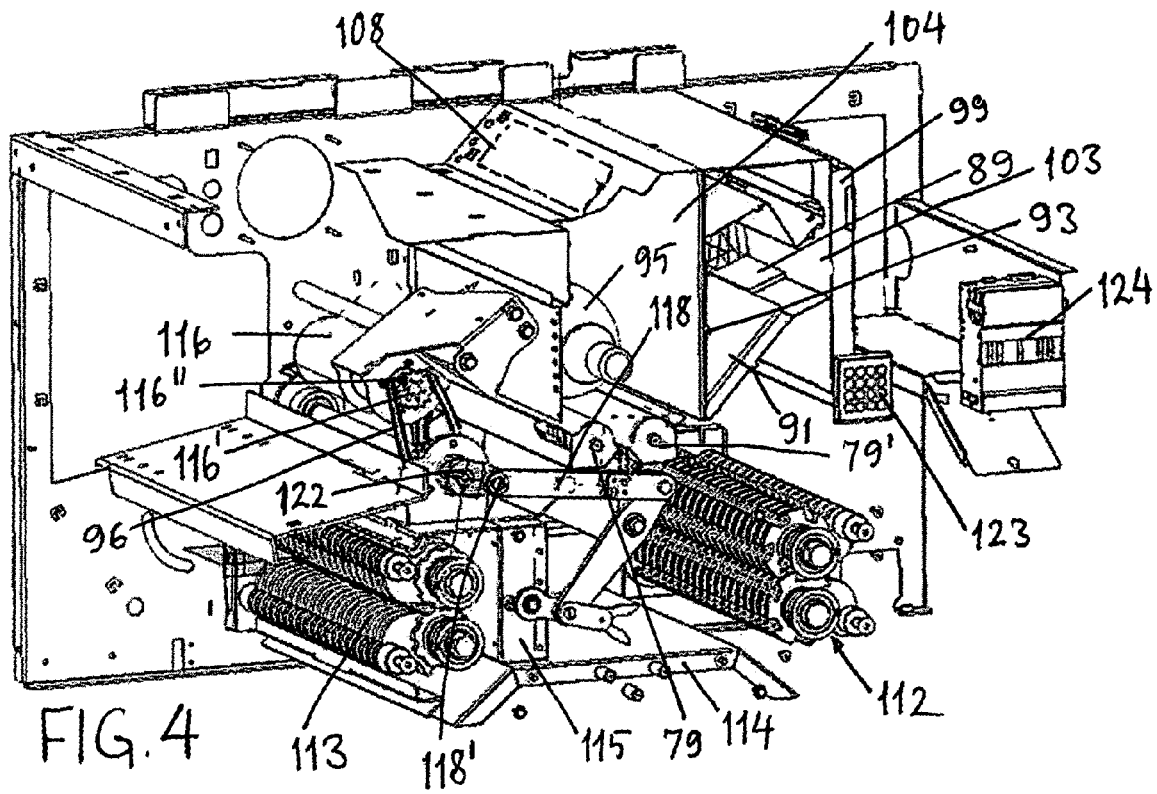
FIGS. 4 and 5 illustrate the apparatus, according to the invention, in conjunction with an apparatus for sorting and destructuring collectable items.
Figure 5:
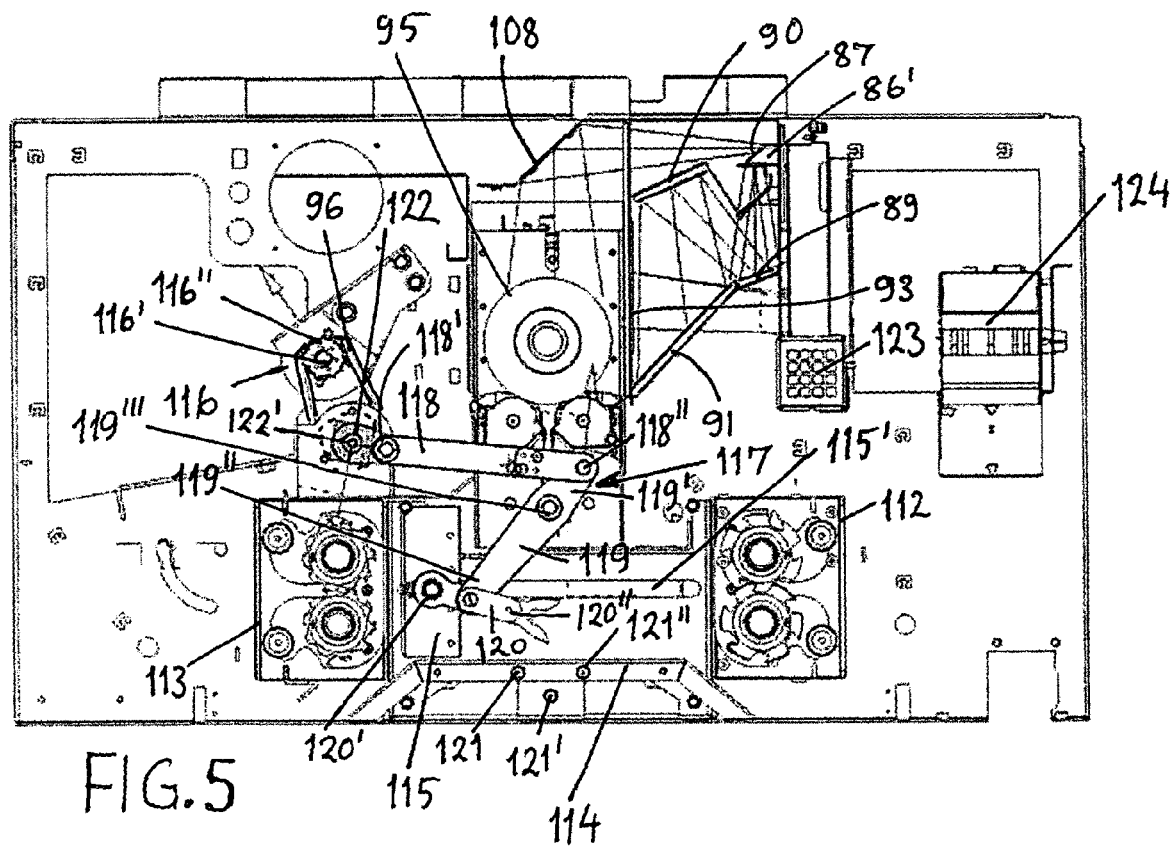

However, in the context of FIGS. 4 and 5, said apparatus for sorting and destructuring of collectable items is also described, the apparatus being located downstream of and being useful with the apparatus for viewing and detecting collectable items.

It is an important aspect of the invention to avoid the inherent problems of relative positioning of light source and image detector, in particular from point of view of installation and maintenance. If the light source and image detector are located on separate supports, then complex and time-consuming adjustments may be required for proper operation. Also, it is an important that both the light source and the image detector are mechanically linked in order that e.g. vibration will not be of importance, contrary to instability imposed if e.g. the detector is subjected to vibration and not the light source.

Further, it is important to be able to provide an apparatus having an optical system which is efficiently operative with a light source and an image detector, but which is less subjected to contamination caused by dust and pollution in the air, and in particular such contamination caused by so-called "chimney-effect".

Figure 1:
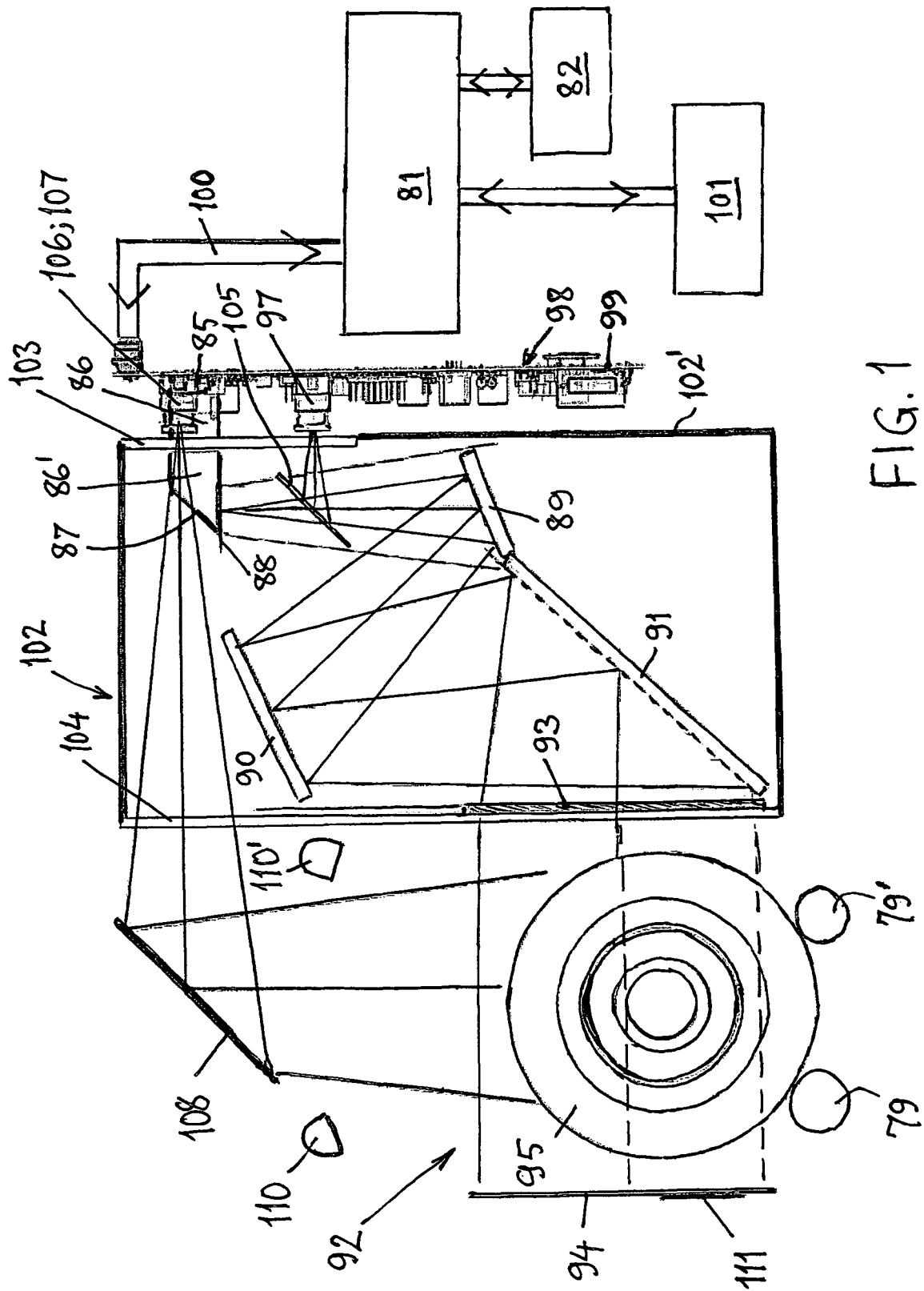

As shown on FIG. 1, in order to overcome these challenges, there is provided a light source 85 capable of projecting light into a tubular light guide 86, 86', the walls of which on the inside of the guide being light reflective, towards a 45° inclined mirror 87, and to project light therefrom through a light diffuser 88 via a light path extender provided by mirrors 89, 90 and 91 towards a detection space via a lens 93 and towards a light reflective surface 94 along the opposite side of the space 92. The reflective surface 94 is a specular mirror or a retro-reflective panel. The space 92 is configured and dimensioned so as to accommodate an item 95. The item 95, e.g. a transparent, partly transparent or non-transparent bottle, or a can of metal, is suitably temporarily placed on a pair of rotary rollers 79, 79' in order to, if required, to rotate the item to find features thereof or thereon not properly detectable in an initial rotary position of the item 95. The rollers 79, 79' are movable apart from each other subsequent to detection of the item, the item thereby falling between the rollers and down to further handling apparatus, as will be apparent in particular from viewing FIGS. 4 and 5.

The inventive light guide 86, 86' is, as indicated on FIG. 3 formed by two parts, the first part 86 extending from the light source 85 to a window element 103 of an optical compartment 102, to be further explained below, and a second part 86' terminated by the inclined mirror 87 where light exits through an aperture 86" and then through the light diffuser 88.

The inventive light guide 86, 86' is, as indicated on FIG. 3 formed by two parts, the first part 86 extending from the light source 85 to a window element 103 of an optical compartment 102, to be further explained below, and a second part 86' terminated by the inclined mirror 87 where light exits through an aperture 86" and then through the light diffuser 86.

A camera 97 is configured to detect any light reflected from said surface 94 and not hidden by the item 95, thus representing an image of the item 95. Operational electronics 98 are associated with said light source 85 and said image detecting camera 97. Said light source 85, said camera 97 and said operational electronics 98 are all installed on a single, common circuit board 99, and said light source 85 and said camera 97 are laterally spaced from each other on the common circuit board 99, as clearly seen on FIG. 2.

A major advantage, though, is that the source 85 and the camera 97 are on a single, common circuit board, thus having a strong mechanical link. Further, such structure enables convenient installation with neglible or a minimum of adjustments, compared to alignments and adjustments required if the devices had been located on separate circuit boards. Also, if a failure of any of the devices 85 and 97 happens, or for that matter the electronics 98, the entire circuit board 99 can simply be unplugged and replaced by a new unit.

The electronics 98 are suitably connected via a cable 100 to a processor, such as the previously mentioned processor 81, the processor capable of delivering at its output also data related to an image or images of the item 95. The processor 81 is suitably connected to an image library 101 in order to swiftly compare detected characteristics with image characteristics present in the library.

A concern from point of view of maintenance is to keep the optical part of the detection system clean. Such cleanliness can be a substantial challenge, e.g. when the apparatus is intended for operating in a polluted atmosphere, such as may be present in major cities. In most cases the heat generating electronics and lighting are located at a top region of an optical system, such as including mirrors and lenses. Although such optical system may be substantially enclosed, nevertheless the positioning of such heat generating components easily creates the mentioned, so-called chimney effect, which implies that dust and other potentially polluting particles are drawn through the optical system and thereby easily accumulate on optical parts therein.

In order to reduce such contamination and thereby reduce any cleaning to a minimum, the circuit board 99 is located exterior to an upright face 102' of the closed optics compartment 102. Closed in this context may imply enclosed component assembly, the assembly possibly sealed, pressure compensated, substantially enclosed or at least substantially dustproof. The part of the compartment 102 being adjacent said circuit board 99 is closed by the transparent window element 103, and the part adjacent said space 92 is closed by the lens 93. The lens may suitably be a Fresnel lens, although other lens types could be used. Because such a lens element is vulnerable to scratches, a protective light transparent panel 104 is located between the lens 93 and said space 92.

The panel is suitably fitted to a housing or frame of the compartment 102 in a sealed manner to avoid any dust or pollution between the lens 93 and the panel 104.

As mentioned above, the light source 85 and the camera 97 are facing said window element 103 to allow light rays from the source 85 to pass through the guide part 86, through the window element 103, through guide part 86', and then via the inclined mirror 87, the diffuser 88, and then further via the light path in said closed optics compartment 103 and said lens 93 and panel 104, and through which window element 103 the camera 97 is able to receive an image of the item 95 as a function of light reflected from the reflective surface 94 and passed via the panel 104, said lens 93, the closed optics compartment 102, and via a 45° inclined, second mirror 105 and the window element 103 through to the camera 97.

The purpose of the lens is to provide parallel light rays across the space 92 towards the reflective surface 94. Therefore, the lens 93 is located adjacent said space 92, and will cause light rays reflected from said reflective surface 94 to be focused towards the camera via the light path extender composed of the mutually inclined mirrors 91, 90 and 89 and said second light redirecting mirror 105 in said closed optics compartment. The term "light path extender" in the present context is in the art of optics frequently also denoted as "folding mirror" device. It simply means that the light path is folded by means of mirrors to extend the total path length the light must travel from an input end to an output end. Although any suitable lens or light ray refractor could be used, the present invention provides a Fresnel lens as the preferred embodiment of the lens element 93.

It will be appreciated from viewing FIG. 1 that the focus of the lens 93 will be beyond the to the right hand side of the drawing sheet. As it is important to make the overall apparatus as compact as possible, the use of the light path extender is essential.

An essential aspect in this context is also to make certain that light from the source 85 is not scattered before reaching the compartment 102 and also that the light when having entered the compartment is properly directed in order to present therein a small, though powerful light source. Therefore, the light guide 86 which surrounds the light source 85 extends from the circuit board 99 to the face of the window element 103. If the guide 86 had not been present, the window element would have scattered a substantial part of the light from the light source 85 back towards to circuit board, in addition to have passed stray light into the compartment. Therefore, the use of the light guide part 86' on the other side of the window element is also essential to provide a concentrated light beam towards the inclined mirror 87.

In order to enable the optical system to become as compact as possible, it is necessary to provide the light path extender 89-91, in the chosen example comprised by three mirrors 89-91 which are inclined relative to each other and relative to the horizontal. The extender is, as seen on FIGS. 1 and 2, in a light path between the mirror 87 and its downstream diffuser 88, and the lens 93. The use of light path extenders is, as mentioned, commonly known within the art of optics.

The use of the light diffuser 88 located downstream of at the first light redirecting mirror 87 will form a light source with small or limited extension, however larger than a point light source. In view of the fact that the focal point of the lens will change slightly as a function of environmental temperature changes which might affect the lens material, the light source as provided as seen when viewing the diffuser 88 will thereby enable to compensate for such deviations.

The size of the light source, in this case the light as appearing from the diffuser, will be cause the optical system to be more robust to temperature variations the larger it is, but if the size becomes too large, the light source will become less efficient. The issue therefore becomes a trade-off between tolerance to temperature deviations and light source efficiency.

In view of the camera 97 not being at the same location on the circuit board as the light 85, it is essential to enable a reflected image to be directed towards the camera. Therefore, the second 45° positioned light redirecting mirror device 105 is semi-transparent to operate as a beam splitter and is located in the light path between said diffuser 88 and a first part 89 of the light path extender 89-91. The use of a beam splitter is inter alia known from GB patent 2,288,016.

It will be appreciated that the use of a lens 93 is preferable from the point of view of directing the light across the space 92 as parallel light rays. However, if a lens were not to be used, this would imply that the item would be viewed in a perspective view. This would in a way be acceptable, provided that the position of the item would always be exact in the space, as size errors and other errors otherwise could easily appear. Further, the processing of detected images would be more complex, and the type of reflective surface 94 would have to be limited to a retro-reflective surface.

In order to be able to detect features of the item not related to e.g. a contour image detectable by the camera 97, additional cameras 106, 107 may be provided, as seen more clearly on FIG. 2. Such cameras will be able to view the item 95 from above via a 45° inclined, third mirror 108, as seen on FIGS. 1 and 2. These cameras could e.g. view the item 95 in order to detect a bar code 109 or other features present on the item 95. Illumination of the item is suitably made by a pair of light sources 110, 110' or additional light sources. These light sources are, for sake of clarity, not shown on FIG. 2. If the mirror 108 is made semi-transparent, one or more light sources could be located above the mirror 108.

Further, to be able to detect presence of metal in or on the item 95, or to detect whether the item is made from metal, such as in the case of a can, a metal detector 111 may be configured to extend along a substantial length of the rear side of the reflective surface 94.

The apparatus of the invention as so far disclosed is fully operable for handling items which are not destructured as well as for handling items which are to be destructured, i.e. in any case after proper material and/or shape or indicia detection.

However, in order to obtain an optimum storage capacity related to number of received and detected items, the present invention provides for an apparatus and a method for receiving and destructuring collectable items, the apparatus having at least one item destructor 112; 113 at an exit of the apparatus. The apparatus is shown in more detail on FIGS. 4 and 5. The apparatus has an item receiving floor 114 and an item pusher 115 reciprocally and slidably movable along the floor 114. There is provided means, suitably the processor 81 and its output 83 for moving a drive motor 116 to correspondingly drive the pusher 115 to be positioned at correct location on the floor 114, so that the pusher 115 can move the item 95 towards a designated exit and thereby into a related destructuring device, e.g. destructuring device 112 or 113.

Thus, when an item 95 is placed on the floor 114, it will selectively, as a function of the image detection by the camera 97 and any detection by the cameras 106, 107 in cooperation with the processor 81, be engaged by one or the other side surface of the pusher 115 and pushed towards and into engagement with said destructurer 112 or 113. The apparatus is provided with a pusher drive means 117 which is mechanically configured so as to provide gradually increasing pushing force on the item 95 as it approaches the destructurer 112; 113.

The pusher drive means 117 comprises said drive motor 116, first 118, second 119 and third 120 link member pairs, and link registering means 121, 121', 121". Each of said first link members 118 are at one end 118' thereof pivotally operative with a drive shaft 122 powered from a drive shaft 116' of the motor 116 via gears 116" and 122' and a drive chain 96, and at the other end 118" pivotally connected to one end 119' of an associated one of the second link members 119. Each of said second link members 119 is at the other end 119" thereof pivotally linked to an associated one 120 of the third link members at a location between the ends 120', 120" thereof, and at a location 119''' between its ends 119', 119" being pivotally attached to a part of the housing of the apparatus. Each of said third link members 120 is at one end 120' pivotally attached to the pusher 115, and at its other end 120" being fork shaped for successive engagement with registering pins 121, 121', 121" forming said link registering means upon movement of the pusher 115 from one end position to another end position along the floor 114. Interaction between the fork shaped end 120" and the pins 121-121" enables a controlled, reciprocal movement of the pusher 115 when the motor shaft 122 rotates.

As mentioned earlier, the rotary rollers 79, 79' are movable apart from each other once a proper detection of the item 95 has been made, thereby dropping the item onto the floor 114. Although not shown on FIGS. 4 and 5, the floor 114 could be provided with a trap door mechanism to enable the item to drop right through the floor to a receptacle or other handling equipment below the floor, without the item necessarily being destructured.

The destructurer is configured to destructure any collectable item in the form of an empty beverage container, in particular a container being made of plastic material or metal, e.g. aluminium. Suitably, the destructurer 62, 63; 72, 73, 112, 113 is elected from the group of: item compacter, item flattener, item shredder, item chipper, item flaker, and item granulator.

On FIGS. 4 and 5 there is also indicated a reference 123 which is suitably a control panel, e.g. a keypad, and 124 denotes a printer for providing a token for the returned items.

Figure 6:
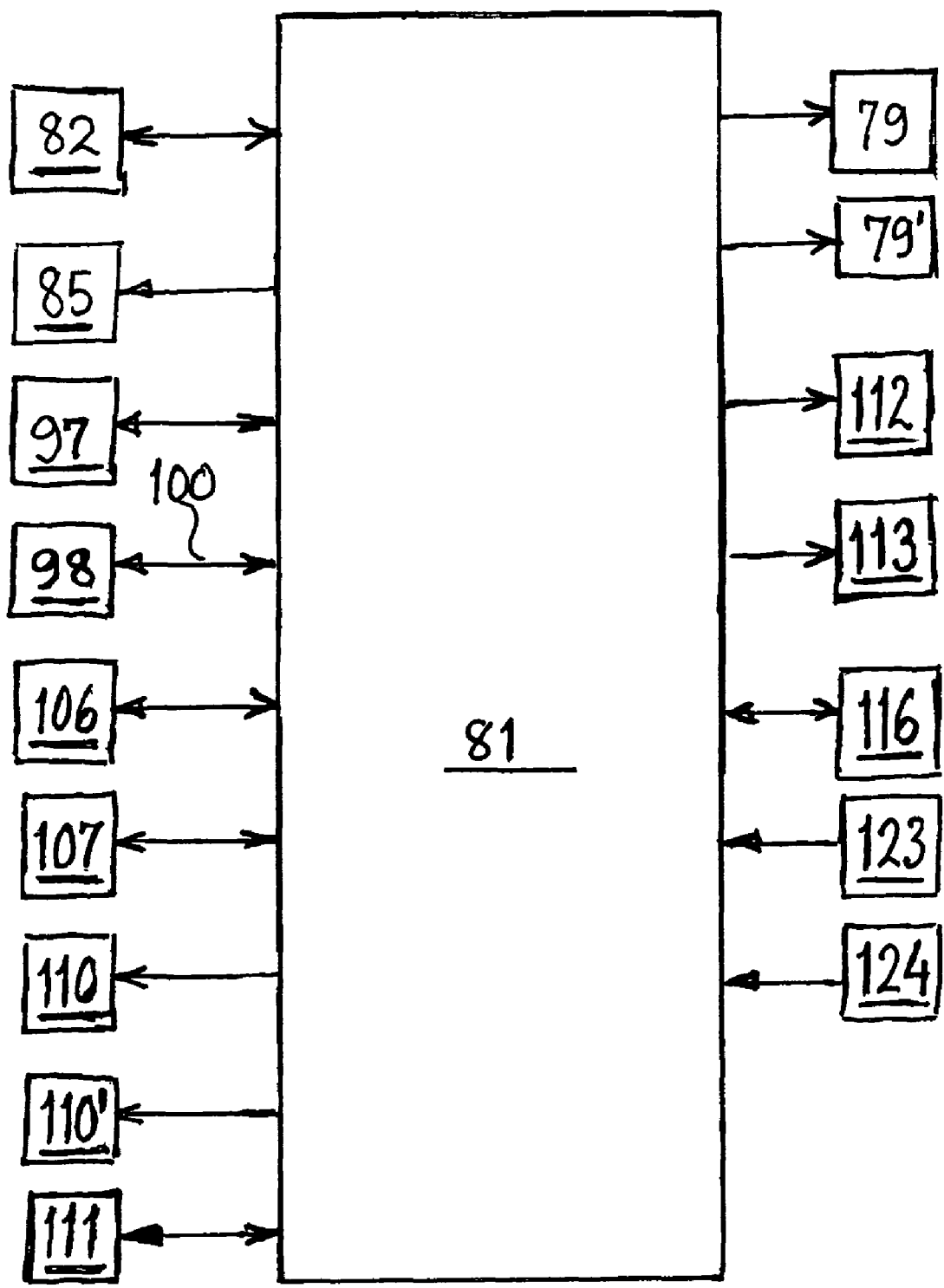
FIG. 6 is schematic overview of electric and electronic components and units which form part of the apparatuses of the present invention.

FIG. 6 provides an overview of the electrical and electronic components and units to be controlled by the processor 81 or at least being cooperative with the processor 81. It will be appreciated that the destructurers suitably are powered by motors running on a continuous basis, or at least operating from a point of time an item is entered for detection and until a final item has been entered and finally processed. It is also appreciated that within the processor there are circuits, connections and interfaces to provide for links between units requiring high power and low power, as well as any logic circuits. Although not shown, it will be understood that the processor and its related cooperative units are connectable to an external power supply.

The apparatus as defined is effective to be able to operate as an item sorter, in addition to cause destructuring of the collected item. Although the apparatus is in particular suitable as part of the inventive apparatuses already disclosed, the apparatus is equally suitable for use as a sorting mechanism in which destructuring is required. Thus, the apparatus is suitable for use in a reverse vending machine, although it is not limited to use in or with a reverse vending machine.

The invention claimed is:

1. An apparatus for generating and viewing an image of an item at least partly against a reflective surface being specular or retro-reflective, the apparatus comprising:
   a light source capable of projecting light towards a space which is dimensioned to accommodate the item when temporarily placed therein,
   an image detecting camera configured to detect an image of the item based on any light reflected from said surface and not hidden by the item, and
   operational electronics associated said light source and said camera,
   wherein said light source, said camera and said operational electronics are installed on a single, common circuit board, said light source and said camera being spaced from each other relative to a plane of the common circuit board,
   wherein the circuit board is located with a plane thereof along an exterior upright wall of a closed optics compartment,
   wherein said wall comprises a transparent window element, and wherein a second and opposite wall of the compartment next to said space comprises a lens or a window with an associated lens,
   wherein the light source is cooperative with a tubular light guide to direct light towards an optical light path for further directing the light towards said space, and
   wherein the light source faces a window element of the closed optics compartment with a first part of the light guide, and directs light further into the optics compartment by means of a second part of the light guide located on the other side of the window element and aligned with the first light guide part.

2. The apparatus of claim 1, wherein inside wall faces of the light guide are light reflective.

3. The apparatus of claim 1, wherein the light guide has a quadratic cross-section.

4. The apparatus of claim 1, wherein the second light guide part at a downstream end has a 45° inclined, first light redirecting mirror, and an output aperture with a light diffuser.

5. The apparatus of claim 1, wherein a protective panel being transparent to light is located between the lens and said space.

6. The apparatus of claim 1, wherein the light source and the camera are facing said window element to allow light rays from the light source to pass through the window element, via a light path in said closed optics compartment and said lens towards the reflective surface, and wherein the camera is able to receive through the window element light reflected from the reflective surface and not hidden by an item present in an inspection region, such light representing an item image passed via said lens and another light path in the closed optics compartment through to the camera.

7. The apparatus of claim 4, wherein a light path extender is located inside said closed optics compartment in a part of a light path between the diffuser and the lens.

8. The apparatus of claim 4, wherein a second redirecting, semi-transparent mirror device is located at an angle of 45° in the light path between said diffuser and a first member of the light path extender to direct a generated item image onto the camera.

9. The apparatus of claim 1, wherein the light path of light reflected from said reflective surface is via said lens, said light path extender, said second redirecting mirror device, said window element and onto said camera.

10. The apparatus of claim 4, wherein the light diffuser contributes to a light source having a small light emitting area.

11. The apparatus of claim 1, wherein said light source and said camera are at or near a focus of the lens.

12. The apparatus of claim 1, wherein the lens is located next to said space for causing light entering said space to be parallel light rays, and causing light rays reflected from said reflective surface to be focused towards the camera via said closed optics compartment.

13. The apparatus of claim 1, wherein the lens is a Fresnel lens.

14. An optical unit comprising:
    a light path extender comprising a plurality of mutually angled mirror members,
    a light source input region,
    a lens unit, and
    at least one image detection output region,
    wherein the optical unit is located in a closed optics compartment, and
    wherein a transparent window element forms at least part of one upright wall of the compartment, said input and output regions being at the location of said window element,
    wherein the light source input region comprises a first tubular light guide part configured to allow a light source to emit light therein, said first guide part contacting an outside of the window element, and a second tubular light guide part contacting the inside face of the window element and aligned with the first guide part, said second light guide part at a downstream end having a first light redirecting mirror, and an output aperture with a light diffuser.

15. The optical unit of claim 14, wherein said first light redirecting mirror is inclined at an angle of 45°.

16. The optical unit of claim 14, wherein inside wall faces of the light guide are light reflective.

17. The optical unit of claim 14, wherein the light guide has a quadratic cross-section.

18. The optical unit of claim 14, wherein a light source and a camera are operative with said light source input region and said image detection output region, respectively, and positioned adjacent an outside face of the transparent window element.

19. The optical unit of claim 14, wherein said lens forms at least part of a second upright wall of the compartment or is located adjacent a transparent window element forming said wall.

20. The optical unit of claim 14, wherein the closed optics compartment further comprises a second, 45° inclined, semi-transparent, image redirecting mirror located in a light path between said diffuser and a first member of the light path extender, said second mirror for redirecting a created item image received via the lens and the light path extender further through the window element onto the camera.

21. The optical unit of claim 20, wherein the light path extender is located inside said closed optics compartment in a part of a light path between the second mirror and the lens.

22. The optical unit of claim 14, wherein the lens is configured to output to the outside of the compartment light as parallel light rays, and cause reflected light rays received as an item image to be focused towards the output region via said closed optics compartment.

23. The optical unit of claim 14, wherein the lens is a Fresnel lens.

24. A device for use in generating and viewing an image of an item at least partly against a reflective surface via an optical unit, the device comprising:
a light source capable of projecting light,
an image detecting camera configured to detect an image of the item, and
operational electronics associated said light source and said camera,
wherein said light source, said camera and said operational electronics are installed on a single, common circuit board,
wherein said common circuit board is configured to be positioned exterior to and with its plane along an upright face of a transparent window element of a closed compartment comprising the optical unit, and
wherein a first tubular light guide part is provided to allow the light source to emit light therein, said first guide part contacting an outside of the window element, a second tubular light guide part contacting the inside face of the window element and aligned with the first guide element, said second light guide part at a downstream end having a first light redirecting mirror, and an output aperture with a light diffuser to direct light to the optical unit.

25. The device of claim 24, wherein said first light redirecting mirror is inclined at an angle of 45°.

26. The device of claim 24, wherein inside wall faces of the light guide are light reflective.

27. The device of claim 24, wherein the light guide has a quadratic cross-section.

28. The device of claim 24, wherein said light source and said camera are laterally spaced from each other on the common circuit board.

29. The device of claim 24, wherein the device further comprises at least one detector configured to read a bar code, other indicia or symbols present on an item, and wherein said at least one detector is located on the same single, common circuit board on which said light source, said camera and said operational electronics are installed.

30. The device of claim 29, wherein said light source, said camera and said at least one detector are mutually and laterally spaced from each other on the common circuit board.

31. A device for delivering light from a light source to a light output aperture of an optical unit inside an optics compartment, wherein the device comprises a first tubular light guide part cooperative with the light source at an upstream end of the first light guide part to direct light from a downstream end of the first light guide part through a window of the compartment, then into a second tubular light guide part aligned with the first light guide part, and then towards an optical light path in the optical unit, the second light guide part at its downstream end having a light redirecting mirror to direct the light to the output aperture, and wherein the output aperture is provided with a light diffuser.

32. The device of claim 31, wherein said light redirecting mirror is inclined at an angle of 45°.

33. The device of claim 31, wherein inside wall faces of the light guide are light reflective.

34. The device of claim 31, wherein the light guide has a quadratic cross-section.

* * * * *